J. F. SEIBERLING.
Harvesters.

No. 135,013.  Patented Jan. 21, 1873.

Witnesses:-
Baltis D. Long.
Cle Davidson.

Inventor:-
John F. Seiberling
by his atty
Wm D. Baldwin

J. F. SEIBERLING.
Harvesters.

No. 135,013.  Patented Jan. 21, 1873.

Witnesses:—
Baltis D. Long.
E. C. Davidson.

Inventor:—
John F. Seiberling
by his Atty
Wm. D. Baldwin

AM. PHOTO-LITHOGRAPHIC CO. N.Y. (OSBORNE'S PROCESS.)

3 Sheets--Sheet 3.

J. F. SEIBERLING.
Harvesters.

No. 135,013. Patented Jan. 21, 1873.

Witnesses:- Inventor:-

UNITED STATES PATENT OFFICE.

JOHN F. SEIBERLING, OF AKRON, OHIO.

IMPROVEMENT IN HARVESTERS.

Specification forming part of Letters Patent No. 135,013, dated January 21, 1873.

*To all whom it may concern:*

Be it known that I, JOHN F. SEIBERLING, of Akron, in the county of Summit and State of Ohio, have invented certain new and useful Improvements in Harvesters, of which the following is a specification, reference being had to the accompanying drawing, in which—

Figure 1:
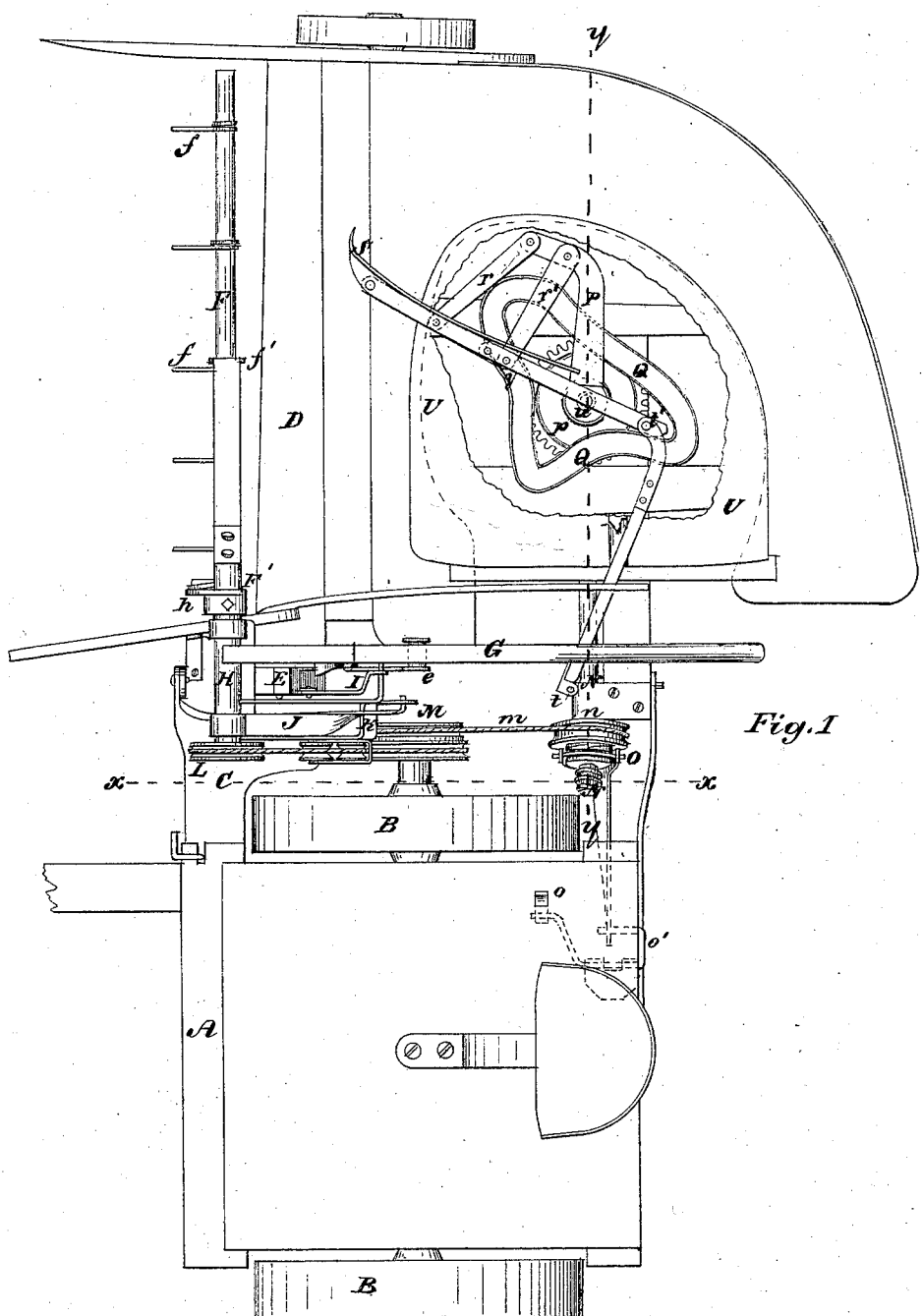
Figure 2:
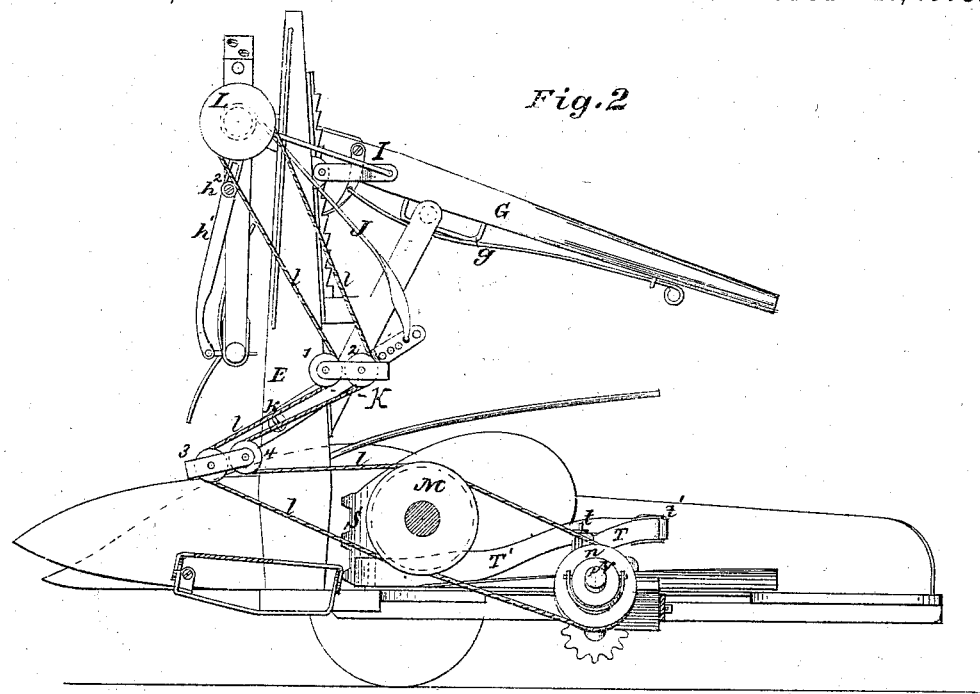
Figure 3:
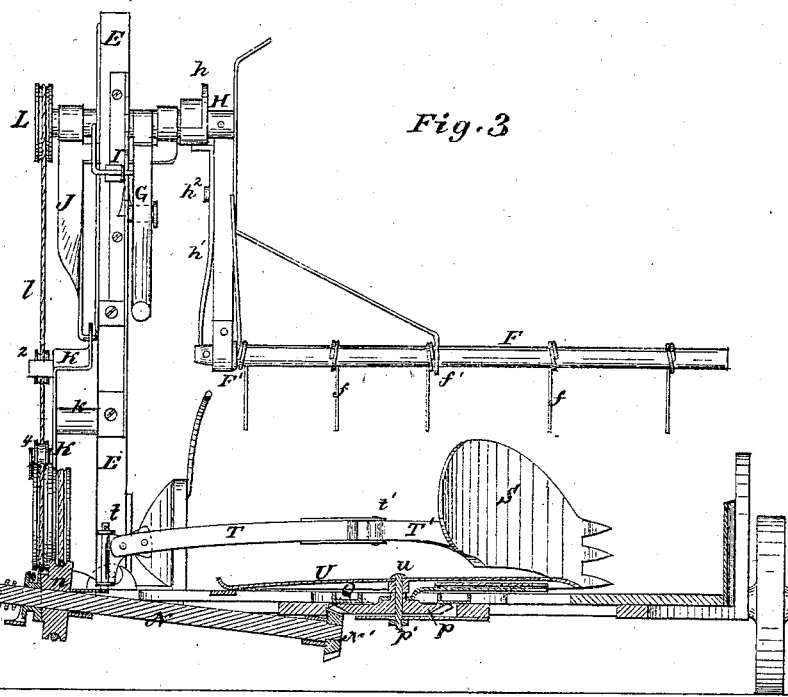
Figure 4:
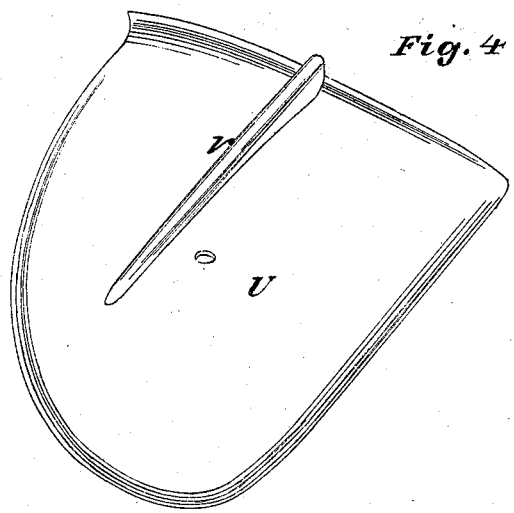
Figure 5:
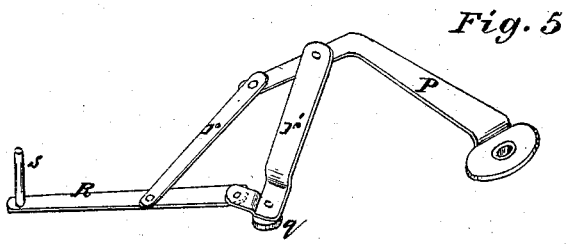

Figure 1 represents a plan view of so much of a harvester, in which my improvements are embodied, as is necessary to illustrate the subject-matter of my claims, the central portion of the platform being broken away to show the rake mechanism. Fig. 2 represents a side elevation of the machine, partly in section, through the line $x\,x$ of Fig. 1, looking toward the divider. Fig. 3 represents a rear elevation of the parts shown in Fig. 2, in section, on the line $y\,y$ of Fig. 1; Fig. 4, a perspective view of the platform-shield detached; and Fig. 5 represents a perspective view of the rake-arm detached.

In this instance my improvements are shown as adapted to the well-known "Excelsior Harvester," on which numerous patents have heretofore been granted to me; obviously, however, some of these improvements might be used without the others, and they readily might be adapted to machines of a class or construction differing from that herein shown. The first part of my invention relates to devices whereby the driver is enabled to raise or lower the reel, and constitutes an improvement on the machine shown in my patent of August 1, 1871, No. 117,692. The next part of my invention relates to devices for maintaining the tension of the reel-belt while raising or lowering the reel. The next part of my invention relates to an improvement in automatic rakes of that class which move horizontally over the platform parallel, or nearly so, to the finger-beam, and then draw the grain off the platform. The subject-matter claimed is hereinafter specified.

In the accompanying drawing, a main frame, A, is shown as mounted on two wheels, B. A finger-beam, D, is pivoted to a coupling-frame, C, in turn pivoted to the main frame. A reel-post, E, is mounted on the finger-beam. The reel has spring-teeth $f$ coiled around an oscillating rib, F, supported in bearings $F'\,f'$. A lever, G, is mounted on a sliding fulcrum on an arm or bracket, $e$, projecting from the post, being retained in place by a loop, $g$. The reel-shaft is mounted in a pipe-box, H, which supports a cam, $h$, acting on a link, $h^1$, sliding on a fulcrum, $h^2$, on the reel-arm, and pivoted to the oscillating rake-arm. By this means the teeth are turned down at proper intervals, a spring next the rake-arm turning them up when free from the cam. A radius-link or guide-link, I, connects the lever G and the reel-post, being pivoted to each, and an ordinary rack and detent holds the reel in any desired position. A link, J, is pivoted at one end to the reel-bearing and at the other to an arm, K, rocking on a central pivot, $k$, on the reel-post. Tension-pulleys 1 2 3 4 are arranged in pairs, in frames, pivoted one at each end of this rocking-lever. The chain $l$, which drives the reel, passes from a driving-pulley, M, on the main axle around these tension-pulleys, as shown in the drawing, and around the reel-pulley. This construction permits the reel, when the tension of the reel-belt has once been adjusted, to be raised or lowered without disturbing the tension, and this primary tension adjustment can be effected by means of a series of holes in the rocking-lever, into which a catch on the link J takes, thus varying the radial distance of the tension-pulleys from the reel-axis at pleasure. A sprocket-wheel, M, on the main axle drives a chain, $m$, encircling a pulley, $n$, on a shaft, N, mounted in bearings beneath the platform and inclining upward and outward from its center, by which means the shaft is elevated out of the way of the discharged gavels. The pulley on this shaft is also by this means brought into the same horizontal plane as the driving-pulley, thus clearing obstructions as well as avoiding the tendency of the chain to lift the platform. This shaft, it will be observed, has no connection with the main frame except through the hinges of the coupling-frame, and is thus free to conform to all the movements of the platform. The shaft is thrown into or out of gear by means of a clutch, O, sliding on the shaft, and a feather on the pulley $n$, which turns loosely on the shaft N when disengaged. The clutch is operated by a foot-lever, $o$, on the main frame and a compound lever or link-connection, $o'$. The driver is thus enabled at pleasure to stop and start the rake. A bevel-wheel, N', drives a corresponding pinion, $p$, on a vertical shaft, $p'$, turning in proper bearings underneath the platform. This shaft carries a crank-arm, P, bent horizontally at its outer end to form an elbow, as shown in Fig. 1. Two links, $r\ r'$, are pivoted at one end to this elbow and at the other to an arm, R, as shown in Fig. 5. A friction-roller, $q$, on the under side of this arm, at its point of juncture with the link $r$, traverses an eccentric guide-cam, Q, (see Fig. 1,) underneath the platform. A pin, $s$, on the arm R enters a hole in the first joint of the rake-stale, which carries the rake-head S. The inner end of the rake-stale swings on a pivot, $t$, mounted on the platform-frame in the line of the joints connecting the main frame and coupling-frame, and nearly equidistant from the front and rear of the platform. The stale-arm T swings freely horizontally on its pivot $t$ at one end, and at the other is pivoted, by a hinge, $t'$, to a second stale-arm, T', which carries the rake, as above set forth. The cam-guide and gearing are so arranged that the arm R slides over the upper surface of the platform. To protect the gearing I cover the central portion of the platform with an elastic or flexible shield, U, between which and the platform the arm R travels, the connection between the arm and rake being formed outside of the shield. A screw or bolt, $u$, passes down through this shield and holds it securely in place. A rib, V, is arranged on this shield parallel with the finger-beam, inclining from the gearing to the grain side thereof, to cause the grain to slide toward the grain side of the platform.

The operation of rakes of this class is well understood, but the operation of my rake differs from others, owing to its peculiarities of construction. My rake is pivoted on the gearing side of the platform and in advance of its rear edge. My rake enters the fallen grain just back of the inner divider, sweeps across the platform to the grain side thereof, then moves back in the arc of a circle and discharges the gavel behind the pivot of the rake and well out of the way of the team during the next round. The inclined rib V aids the rake by causing the grain to slip over toward the divider-end of the platform, where it lies directly in the path of the rake. The reel gathers the grain to the cutters, but its teeth, being elastic, yield to the rake as it sweeps across the platform, and thus prevents breakage. I am thus enabled effectively to operate upon long or short, lodged or straight, grain.

I claim as my invention—

1. The combination of a supporting-fulcrum for the reel-supporting lever and the pivoted guiding-link connecting the reel-post and lever, substantially as and for the purpose set forth.

2. The centrally-pivoted rocking lever K, constructed substantially as set forth, with two sets of tension-pulleys pivoted thereon, and having an adjustable link connection with the reel-support, for the purposes set forth.

3. The combination of the sprocket-wheel on the inner end of the main axle, the rake-driving chain, and the sprocket-wheel on the inner end of the rake-driving shaft, which extends beneath the platform, the sprocket-pulley being in or near the line of the hinges of the platform, substantially as set forth.

4. The combination of the jointed rake-stale, the rotating driving-arm P, the connecting-links $r\ r'$ pivoted to the driving-arm and stale, and the guide-cam, these members being constructed and operating in combination, substantially as set forth, to impart the requisite movements to the rake.

5. The combination of the revolving rake-arm and the stationary elastic shield, constructed as set forth, between which and the platform the rake-arm traverses, which shield rises to allow the rake-arm to pass, and then sinks to prevent the mechanism from clogging.

In testimony whereof I have hereunto subscribed my name.

JOHN F. SEIBERLING.

Witnesses:
N. D. TIBBALS,
W. S. CLARKE.